(12) United States Patent
Cheng et al.

(10) Patent No.: US 9,807,105 B2
(45) Date of Patent: Oct. 31, 2017

(54) ADAPTIVE BEHAVIOR PROFILING AND ANOMALY SCORING THROUGH CONTINUOUS LEARNING

(71) Applicant: International Business Machines Corporation, Armonk, NY (US)

(72) Inventors: Pau-Chen Cheng, Yorktown Heights, NY (US); Lawrence Koved, Pleasantville, NY (US); Kapil K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 14/938,415

(22) Filed: Nov. 11, 2015

(65) Prior Publication Data

US 2017/0134412 A1    May 11, 2017

(51) Int. Cl.
G06F 21/00 (2013.01)
H04L 29/06 (2006.01)
H04L 29/08 (2006.01)

(52) U.S. Cl.
CPC ...... H04L 63/1425 (2013.01); H04L 67/2842 (2013.01); H04L 67/306 (2013.01)

(58) Field of Classification Search
CPC .............. H04L 63/1416; H04L 63/1425; H04L 63/1433; H04L 41/20; H04L 43/12; H04L 43/16; H04L 63/0861; H04L 63/1408; H04L 63/1466; H04L 67/02; H04L 67/303
See application file for complete search history.

(56) References Cited

U.S. PATENT DOCUMENTS

| | | | |
|---|---|---|---|
| 6,601,048 B1 | 7/2003 | Gavan et al. | |
| 2006/0059063 A1* | 3/2006 | LaComb | G06Q 40/00 705/35 |
| 2007/0022025 A1* | 1/2007 | Litman | G06Q 40/00 705/30 |
| 2009/0150212 A1* | 6/2009 | Steuben | G06Q 10/063 705/7.11 |
| 2011/0213788 A1 | 9/2011 | Zhao et al. | |
| 2014/0157405 A1* | 6/2014 | Joll | H04L 63/1425 726/22 |
| 2014/0359777 A1* | 12/2014 | Lam | G06F 21/577 726/25 |
| 2015/0135263 A1 | 5/2015 | Singla et al. | |
| 2016/0028752 A1* | 1/2016 | Di Pietro | H04L 63/1416 726/23 |
| 2016/0164902 A1* | 6/2016 | Moore | H04L 63/1433 726/25 |

* cited by examiner

Primary Examiner — Ghazal Shehni
(74) Attorney, Agent, or Firm — Yee & Associates, P.C.; Jeffrey S. LaBaw (57) ABSTRACT

Generating a behavior profile is provided. A newness score is calculated for a data point corresponding to a context of an access request to a resource made by a user of a client device. Newness scores for a plurality of data points corresponding to contexts of a plurality of access requests are aggregated to form an aggregated newness score. In response to determining that the aggregated newness score is greater than or equal to a pre-defined newness score threshold, data points stored in a data point cache and a long-term storage are used to generate a new behavior profile for the user or update an existing behavior profile for the user.

19 Claims, 8 Drawing Sheets

ANOMALY SCORE FUSION ALGORITHM
700

Input: *profile anomaly score* and *cache anomaly score*, $0 \leq$ *cache anomaly score* $<$ *profile anomaly score* $\leq 1$ Let *bdist* be a standard Beta distribution with the following property:
Let *p* and *q* be the shape parameters of *bdist*
$p+q = 100$
$p = ((\textit{cache anomaly score})/(\textit{profile anomaly score})) * (p+q)$ Let *r* be the 95% quantile for *bdist* such that $\int_0^r bdist(x)dx = 0.95$ and
let $v = (\textit{profile anomaly score}) * r$ Output: *composite anomaly score* = $v$, if $v >$ (*cache anomaly score*)
composite anomaly score = cache anomaly score, if $v \leq$ (cache anomaly score)

ADAPTIVE BEHAVIOR PROFILING AND ANOMALY SCORING THROUGH CONTINUOUS LEARNING

This invention was made with Government support under contract Numbers: FA8750-12-C-0265 awarded by Department of Homeland Security. The Government has certain rights in this invention.

BACKGROUND

1. Field

The disclosure relates generally to assessing risk and more specifically to adaptively profiling behavior of a user and calculating anomaly scores corresponding to a context of a current request to access a resource by the user via continuous machine learning.

2. Description of the Related Art

Computer systems are increasingly making security-related decisions by assessing the risk associated with these security-related decisions. For example, when an entity requests an electronic fund transfer out of an account of a bank customer, the bank's computer may compare the entity's current request, against a history of similar requests made by the bank customer, to determine how likely the current request is a fraudulent request made by an impostor. Traditionally, detecting fraudulent requests focused on properties associated with a particular request, such as, for example, Internet Protocol (IP) address of the device used to make the request or indications of malware being present on the device used to make the request.

SUMMARY

According to one illustrative embodiment, a computer-implemented method for generating a behavior profile is provided. A computer calculates a newness score for a data point corresponding to a context of an access request to a resource made by a user of a client device. The computer aggregates newness scores for a plurality of data points corresponding to contexts of a plurality of access requests to form an aggregated newness score. In response to the computer determining that the aggregated newness score is greater than or equal to a pre-defined newness score threshold, the computer uses data points stored in a data point cache and a long-term storage to generate a new behavior profile for the user or update an existing behavior profile for the user. According to other illustrative embodiments, a computer system and computer program product for generating a behavior profile are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
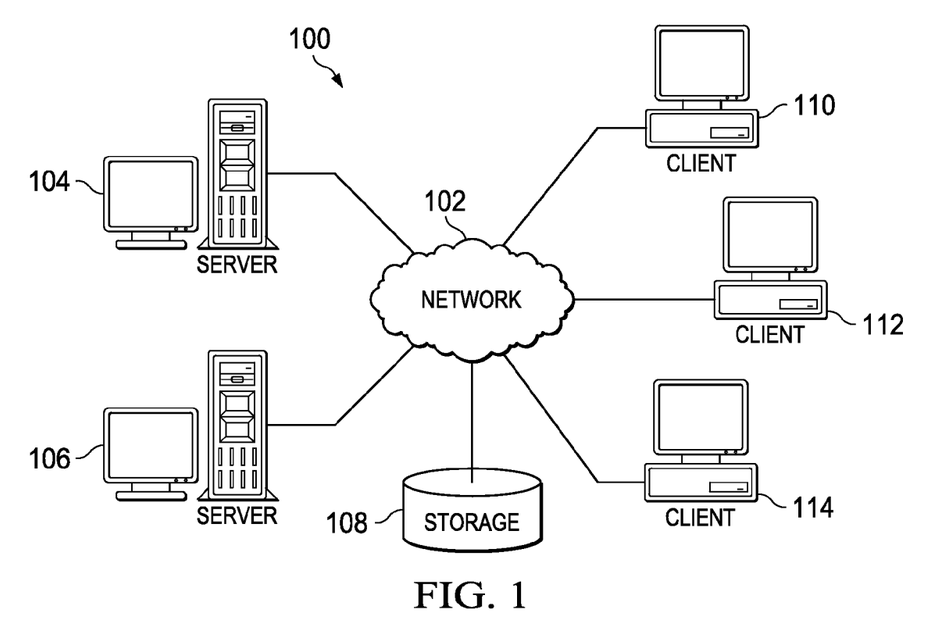
FIG. 1 is a pictorial representation of a network of data processing systems in which illustrative embodiments may be implemented.
Figure 2:
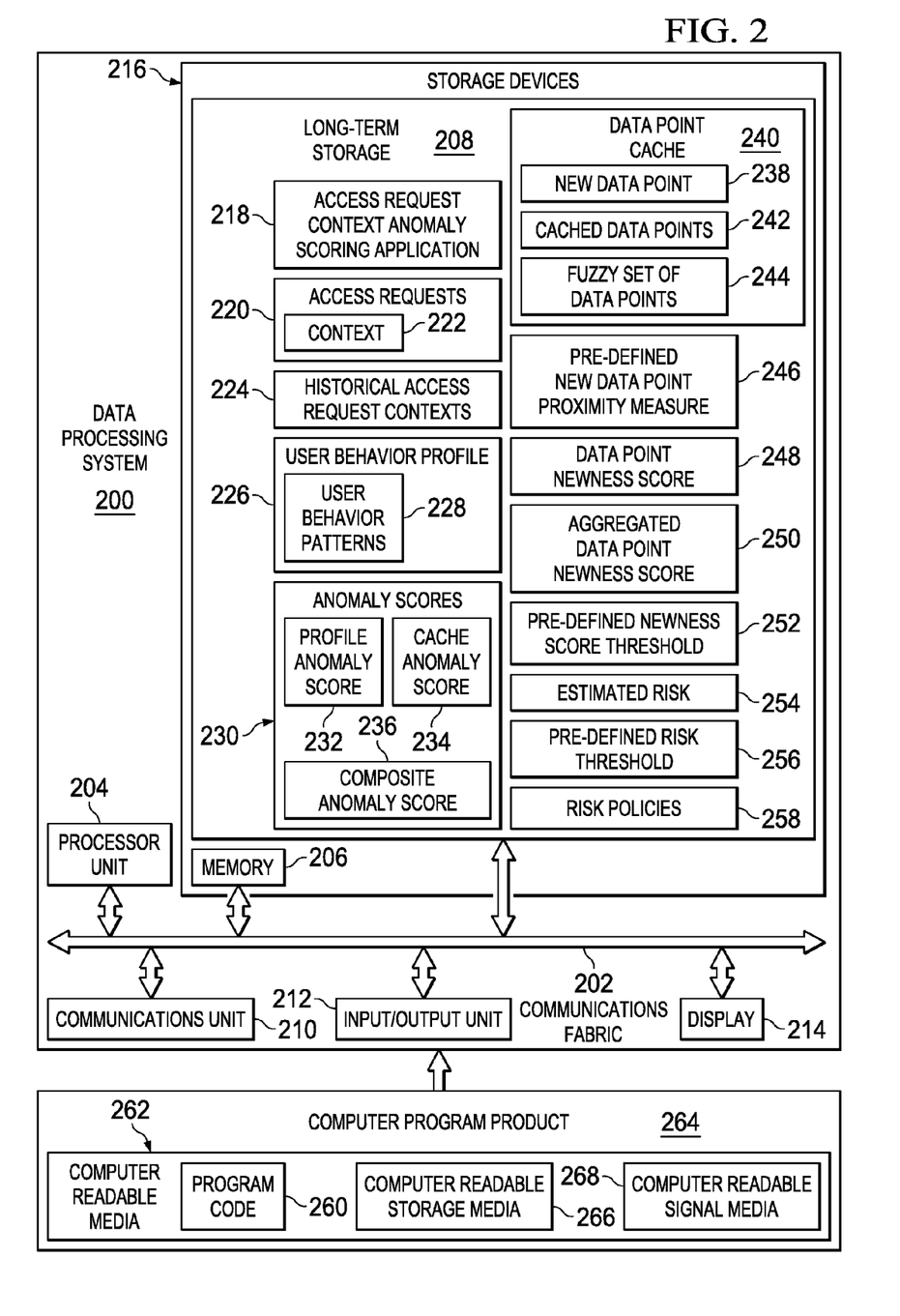
FIG. 2 is a diagram of a data processing system in which illustrative embodiments may be implemented.
Figure 3:
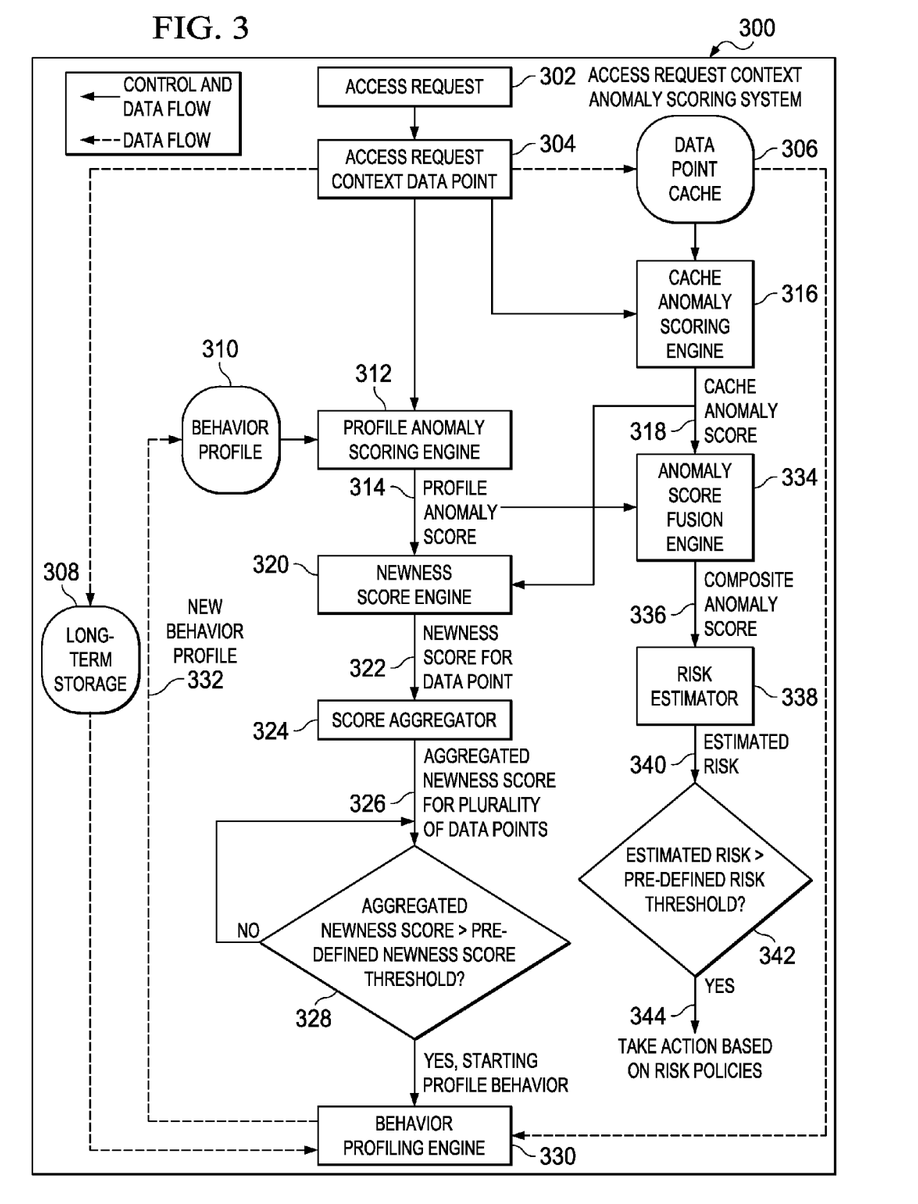
FIG. 3 is a diagram of an example of an access request context anomaly scoring system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices. The set of services may be, for example, financial services associated with a financial institution, such as a bank. Further, server 104 and server 106 may provide risk assessment and fraud prevention services regarding access requests to resources of the set of services by adaptively profiling behavior of requesting users and calculating anomaly scores corresponding to a context of current requests to access the resources by the requesting users via continuous machine learning. In an alternative embodiment, server 104 may provide the set of services to the client devices and server 106 may provide the risk assessment and fraud prevention services regarding the access requests to the resources of the set of services. Further, server 106 may provide these risk assessment and fraud prevention services to multiple enterprises.

Client device 110, client device 112, and client device 114 also connect to network 102. Client devices 110, 112, and 114 are clients of server 104 and server 106. Server 104 and server 106 may provide information, such as boot files, operating system images, and software applications to client devices 110, 112, and 114.

Client devices 110, 112, and 114 may be, for example, computers, such as network computers or desktop computers with wire or wireless communication links to network 102. However, it should be noted that client devices 110, 112, and 114 are intended as examples only. In other words, client devices 110, 112, and 114 also may include other devices, such as, for example, laptop computers, handheld computers, smart phones, smart watches, personal digital assistants, gaming devices, or any combination thereof. Users of client devices 110, 112, and 114 may use client devices 110, 112, and 114 to request access to a resource protected by server 104 and/or server 106. The access request may be, for example, a request to access a bank account to perform a financial transaction, such as, for example, transferring monetary funds from a source or paying account to a destination or receiving account to complete the financial transaction.

Storage 108 is a network storage device capable of storing any type of data in a structured format or an unstructured format. In addition, storage 108 may represent a set of one or more network storage devices. Storage 108 may store, for example, names and identification data for a plurality of users, historical access request context data, user behavior profile data, anomaly score data, threshold data, and risk policy data. Further, storage unit 108 may store other data, such as authentication or credential data that may include user names, passwords, and biometric data associated with the users and system administrators.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110. In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, long-term storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and long-term storage 208 are examples of storage devices 216. A computer readable storage device is any piece of hardware that is capable of storing information, such as, for example, without limitation, data, computer readable program code in functional form, and/or other suitable information either on a transient basis and/or a long-term basis. Further, a computer readable storage device excludes a propagation medium. Memory 206, in these examples, may be, for example, a random access memory, or any other suitable volatile or non-volatile storage device. Long-term storage 208 may take various forms, depending on the particular implementation. For example, long-term storage 208 may contain one or more devices. For example, long-term storage 208 may be a hard drive, a flash memory, a rewritable optical disk, a rewritable magnetic tape, or some combination of the above. The media used by long-term storage 208 may be removable. For example, a removable hard drive may be used for long-term storage 208.

In this example, long-term storage 208 stores access request context anomaly scoring application 218. Access request context anomaly scoring application 218 monitors access requests 220 made by users of client devices to protected resources and identifies context 222 of each access request. Access request context anomaly scoring application 218 may compare context 222 with historical access request contexts 224 to identify anomalous contexts or contexts that are not similar to historical access request contexts 224.

In addition, access request context anomaly scoring application 218 adaptively generates user behavior profile 226 for each user by identifying user behavior patterns 228 within data corresponding to user access requests made by each particular user. Further, access request context anomaly scoring application 218 calculates anomaly scores 230, which correspond to the context of each access request, via continuous machine learning. Anomaly scores 230 may include profile anomaly score 232, cache anomaly score 234, and composite anomaly score 236.

Access request context anomaly scoring application 218 may calculate profile anomaly score 232 by, for example, comparing data corresponding to context 222 of a current access request to data in user behavior patterns 228 of user behavior profile 226 corresponding to the user making the current access request. Access request context anomaly scoring application 218 may calculate cache anomaly score 234 by, for example, comparing new data point 238, which corresponds to context 222 of the current access request, located in data point cache 240 with previously cached data points 242, which correspond to the contexts of previous access requests. In this example, access request context anomaly scoring application 218 maintains data point cache 240 in long-term storage 208. However, it should be noted that access request context anomaly scoring application 218 may maintain data point cache 240 in another device, such as, for example, memory 206 or processor unit 204. Alternatively, data point cache 240 may be a separate device in data processing system 200.

Access request context anomaly scoring application 218 may generate or update a fuzzy set of data points 244 for new data point 238 by using pre-defined new data point proximity measure 246. Pre-defined new data point proximity measure 246 identifies data points within cached data points 242 that are in close proximity to new data point 238 or are within a pre-defined distance of new data point 238 to identify user behavior patterns.

Access request context anomaly scoring application 218 also may calculate a data point newness score 248 for each new data point 238. Access request context anomaly scoring application 218 may calculate a data point newness score 248 by, for example, subtracting cache anomaly score 234 from profile anomaly score 232, both of which correspond to a new data point 238. Further, access request context anomaly scoring application 218 may aggregate data point newness score 248 with data point newness scores corresponding to a plurality of other cached data points by, for example, summation to form aggregated data point newness score 250.

Access request context anomaly scoring application 218 compares aggregated data point newness score 250 to pre-defined newness score threshold 252. In response to access request context anomaly scoring application 218 determining that aggregated data point newness score 250 is greater than or equal to pre-defined newness score threshold 252, access request context anomaly scoring application 218 either generates a new user behavior profile 226 for the requesting user, if a behavior profile has not already been generated for that particular user, or updates an existing user behavior profile 226 for that particular user.

Access request context anomaly scoring application 218 also may calculate estimated risk 254 corresponding to the current access request based on composite anomaly score 236, for example. Estimated risk 254 is a calculated level of risk associated with allowing the current request to access a protected or a restricted access resource. Access request context anomaly scoring application 218 compares estimated risk 254 to pre-defined risk threshold 256. In response to access request context anomaly scoring application 218 determining that estimated risk 254 is greater than or equal to pre-defined risk threshold 256, access request context anomaly scoring application 218 takes action based on risk policies 258. Risk policies 258 are a set of one or more risk policies that define appropriate action. One action may be, for example, to block the current access request and notify a system administrator of possible fraudulent activity. Another example of an action may be to mitigate the risk by notifying an owner of the resource, such as a bank account owner, regarding the access request and request confirmation to allow the access request to the resource.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on long-term storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or long-term storage 208.

Program code 260 is located in a functional form on computer readable media 262 that is selectively removable and may be loaded onto or transferred to data processing system 200 for running by processor unit 204. Program code 260 and computer readable media 262 form computer program product 264. In one example, computer readable media 262 may be computer readable storage media 266 or computer readable signal media 268. Computer readable storage media 266 may include, for example, an optical or magnetic disc that is inserted or placed into a drive or other device that is part of long-term storage 208 for transfer onto a storage device, such as a hard drive, that is part of long-term storage 208. Computer readable storage media 266 also may take the form of a long-term storage, such as a hard drive, a thumb drive, or a flash memory that is connected to data processing system 200. In some instances, computer readable storage media 266 may not be removable from data processing system 200.

Alternatively, program code 260 may be transferred to data processing system 200 using computer readable signal media 268. Computer readable signal media 268 may be, for example, a propagated data signal containing program code 260. For example, computer readable signal media 268 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 260 may be downloaded over a network to long-term storage 208 from another device or data processing system through computer readable signal media 268 for use within data processing system 200. For instance, program code stored in a computer readable storage media in a data processing system may be downloaded over a network from the data processing system to data processing system 200. The data processing system providing program code 260 may be a server computer, a client computer, or some other device capable of storing and transmitting program code 260.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, long-term storage 208, and computer readable storage media 266 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that the risk associated with a context of a request to access a resource by a user can be estimated by comparing the request context with a history of similar request contexts to determine how anomalous the current request context is in relation to the history of similar request contexts. For example, if a customer of a bank usually conducts online banking transactions from the customer's home between 6:00 and 10:00 PM, then a request for funds transfer out of the customer's bank account made at 2:00 AM at a geographic location far away from the customer's home is very suspicious and likely fraudulent.

The history of certain characteristics of the behavior of a user, such as a person, a group of persons, a device, a group of devices, or more generally, an entity or a group of entities, may be summarized in a user behavior profile. Such a behavior profile is a model of what is considered normal behavior for a user, including the contexts of the behaviors. An example of a behavior is performing an online banking transaction and the context of the behavior may include a source location (e.g., user's residence) from where the transaction request originated and a time (e.g., 6:00 PM) when the transaction request was submitted. By comparing the context of the current request with a behavior profile corresponding to the user, illustrative embodiments may determine how anomalous the current request context is with respect to the user's behavior profile. The more the context of the current request deviates from the user's patterns of behavior in the user's behavior profile, the more illustrative embodiments consider the context of the current request anomalous and, therefore, likely fraudulent.

Illustrative embodiments may represent the degree of a request context being anomalous by generating an anomaly score corresponding to the context of the current request. In addition, illustrative embodiments may utilize the generated anomaly score as one possible input for assessing/estimating risk associated with the current request.

Illustrative embodiments learn new user behavior patterns and build a user behavior profile gradually over time based on discovering the new user behavior patterns, while simultaneously producing anomaly scores for current requests that reflect the gradual learning of the user behavior patterns, assuming the behavior of the user (e.g., person or entity) may change over time. The more illustrative embodiments learn about a user's behavior patterns, the more familiar illustrative embodiments become with those behavior patterns and, therefore, the less anomalous those behavior patterns become to illustrative embodiments.

To build a behavior profile of a user, illustrative embodiments collect data samples of a user's behavior over time and analyze these collected data samples to find behavior patterns in the data. A behavior profile of a user is basically these discovered behavior patterns represented in a certain form. The collected data samples are also called data points in this disclosure.

However, collecting data samples takes time and the user may need to conduct business with an enterprise, such as a bank, before the enterprise has time to collect enough data samples from the user to build a behavior profile corresponding to that particular user. For example, the user may have just opened an account with a bank and started doing online banking transactions before the bank had an opportunity to build a behavior profile for the user. The enterprise must make a risk assessment regarding the context of the user's requests before the enterprise has a behavior profile for the user and the risk assessment must reflect a gradual learning of the user's behavior patterns. For example, the bank's risk assessment regarding the context of the user's requests for online banking transactions should gradually drop as the bank's computer gradually learns the user's behavior patterns, before the bank's computer even builds a behavior profile for the user.

Even after an enterprise's computer builds a behavior profile for a user, the user's behavior may change over time. Consequently, the enterprise's computer must adapt to such behavior changes by continuously learning the user's new behavior patterns and updating the behavior profile to reflect these behavior pattern changes. For example, a bank customer may change jobs and/or place of residence and, therefore, the bank customer's usual time and location of doing online banking transactions may change as well.

As a result, an enterprise's computer needs to: 1) continuously learn and adapt to a user's behavior and simultaneously keep a behavior profile corresponding to the user up-to-date; and 2) generate anomaly scores corresponding to a context of a current access request, while the enterprise's computer learns the user's behavior patterns and generates a new behavior profile of the user or updates an existing behavior profile of the user. Illustrative embodiments address these two needs simultaneously.

With reference now to FIG. 3, a diagram of an example of an access request context anomaly scoring system is depicted in accordance with an illustrative embodiment. Access request context anomaly scoring system 300 may be implemented in a data processing system, such as, for example, data processing system 200 in FIG. 2. Access request context anomaly scoring system 300 adaptively profiles behavior of a user and calculates anomaly scores corresponding to a context of a current request to access a resource by the user via continuous machine learning.

For example, access request context anomaly scoring system 300 receives access request 302. Access request 302 requests access to a resource protected by access request context anomaly scoring system 300. Access request 302 may be, for example, an access request of access requests 220 in FIG. 2.

After receiving access request 302, access request context anomaly scoring system 300 determines access request context data point 304. Access request context data point 304 corresponds to the context of access request 302. Access request context data point 304 may be, for example, new data point 238 in FIG. 2. Access request context anomaly scoring system 300 stores access request context data point 304 in data point cache 306. Data point cache 306 may be, for example, data point cache 240 in FIG. 2. In addition, access request context anomaly scoring system 300 stores access request context data point 304 in long-term storage 308. Long-term storage 308 may be, for example, storage 108 in FIG. 1 or long-term storage 208 in FIG. 2.

Access request context anomaly scoring system 300 uses behavior profile 310 and profile anomaly scoring engine 312 to generate profile anomaly score 314. Behavior profile 310 may be, for example, user behavior profile 226 in FIG. 2. Behavior profile 310 corresponds to the user submitting access request 302. Profile anomaly score 314 may be, for example, profile anomaly score 232 in FIG. 2. Profile anomaly score 314 corresponds to access request context data point 304.

Access request context anomaly scoring system 300 uses data cache 306 and cache anomaly scoring engine 316 to generate cache anomaly score 318. Cache anomaly score 318 may be, for example, cache anomaly score 234 in FIG. 2. Cache anomaly score 318 also corresponds to access request context data point 304.

Access request context anomaly scoring system 300 inputs profile anomaly score 314 and cache anomaly score 318 into newness score engine 320. Newness score engine 320 generates newness score for data point 322 based on the difference between profile anomaly score 314 and cache anomaly score 318. Newness score for data point 322 corresponds to access request context data point 304. Newness score for data point 322 may be, for example, data point newness score 248 in FIG. 2.

Access request context anomaly scoring system 300 inputs newness score for data point 322 into score aggregator 324. Score aggregator 324 aggregates newness scores for a plurality of data points, such as cached data points 242 in FIG. 2, by summation, for example. Score aggregator 324 generates aggregated newness score for plurality of data points 326. Aggregated newness score for plurality of data points 326 may be, for example, aggregated data point newness score 250 in FIG. 2.

Access request context anomaly scoring system 300 determines whether aggregated newness score for plurality of data points 326 is greater than or equal to a pre-defined newness score threshold at 328. The pre-defined newness score threshold may be, for example, pre-defined newness score threshold 252 in FIG. 2. If aggregated newness score for plurality of data points 326 is greater than or equal to the pre-defined newness score threshold at 328, then access request context anomaly scoring system 300 starts profiling behavior of the particular user submitting access request 302 using behavior profiling engine 330. Behavior profiling engine 330 generates new behavior profile 322 corresponding to the particular user using data points stored in long-term storage 308 and data point cache 306. Alternatively, behavior profiling engine 330 may update previously existing behavior profile 310 for that particular user based on data points stored in long-term storage 308 and data point cache 306.

Access request context anomaly scoring system 300 also inputs profile anomaly score 314 and cache anomaly score 318 into anomaly score fusion engine 334. Anomaly score fusion engine 334 generates composite anomaly score 336 based on the fusion of profile anomaly score 314 and cache anomaly score 318. Composite anomaly score 336 may be, for example, composite anomaly score 236 in FIG. 2.

Access request context anomaly scoring system 300 may input composite anomaly score 336 into risk estimator 338. Risk estimator 338 generates estimated risk 340, such as estimated risk 254 in FIG. 2. Access request context anomaly scoring system 300 determines whether estimated risk 340 is greater than or equal to a pre-defined risk threshold at 342. The pre-defined risk threshold may be, for example, pre-defined risk threshold 256 in FIG. 2. If estimated risk 340 is greater than or equal to the pre-defined risk threshold at 342, then access request context anomaly scoring system 300 takes action based on risk policies at 344. The risk policies may be, for example, risk policies 258 in FIG. 2.

A user behavior profile, such as behavior profile 310, models certain characteristics of the user's normal behavior. For example, access request context anomaly scoring system 300 builds a user's time/location behavior profile to determine whether that particular user is usually at a specific location at a particular time when the user makes a request to access a particular protected resource. The time and location of the access request are example characteristics of the context of the access request. In general, using behavior profile 310 is a good way to detect a possible fraudulent access request made by an impostor and, therefore, is a good tool when estimating the risk of such an access request. By comparing the user's current context of the access request against behavior profile 310 corresponding to that particular user, access request context anomaly scoring system 300 is able to generate composite anomaly score 336, which access request context anomaly scoring system 300 uses as input to risk estimator 338.

In practice, a user's behavior may change over time so a need exists for access request context anomaly scoring system 300 to continuously detect and learn/discover new behavior patterns. Also, access request context anomaly scoring system 300 may not have a user behavior profile for a newly registered user. In the case of a newly registered user, all the user's behaviors are new to access request context anomaly scoring system 300. Consequently, a need exists for access request context anomaly scoring system 300 to learn these new behavior patterns as quickly as possible.

To detect what is new, access request context anomaly scoring system 300 must first recognize what is old and what is new. Access request context anomaly scoring system 300 considers old that which access request context anomaly scoring system 300 determines to be normal based on patterns found within existing user behavior profiles and considers new that which access request context anomaly scoring system 300 determines to be anomalous based on patterns found within existing user behavior profiles. Access request context anomaly scoring system 300 considers everything anomalous or new when no behavior profile corresponding to the requesting user exists. Access request context anomaly scoring system 300 may view this case as having an empty user behavior profile that does not contain any user behavior patterns.

Continuous learning of user behavior profiles by access request context anomaly scoring system 300 includes three main steps. First, access request context anomaly scoring system 300 detects when new user behavior patterns exist within the cached data points of data point cache 306. Access request context anomaly scoring system 300 collects new data points, such as access request context data point 304, when the user makes an access request, such as access request 302. Access request context anomaly scoring system 300 also stores the new data points in data point cache 306. It should be noted that this first step does not try to discover what the new behavior patterns are, but only to recognize signs for emergence of new behavior patterns.

Second, access request context anomaly scoring system 300 uses an analytical component to discover the new behavior patterns from the cached data points. It should be noted that the analytics component also may discover old behavior patterns that are still in the cached data points. Third, access request context anomaly scoring system 300 builds new user behavior profiles based on the discovered user behavior patterns. After access request context anomaly scoring system 300 builds the user behavior profiles, access request context anomaly scoring system 300 uses these user behavior profiles for anomaly scoring of current access requests to protected resources.

Another important aspect exists when dealing with emerging new user behavior patterns. For example, access request context anomaly scoring system 300 must generate anomaly scores for data point 304 from new user behavior patterns even before the new user behavior patterns are learned and covered by a user behavior profile. This requirement is for usability. The data analytics component needs enough data points to identify a new behavior pattern and to build new behavior profiles. Typically, the data analytics component needs at least tens of data points from a new behavior pattern to recognize this pattern. Before access request context anomaly scoring system 300 builds new behavior profiles, existing behavior profiles will produce a high anomaly score for a new data point from the new behavior pattern. A high anomaly score will likely result in a high risk score, which may result in denial of a legitimate access request or put an extra burden on the user to mitigate the perceived risk. A user may not tolerate such poor usability or wait for access request context anomaly scoring system 300 to collect enough data points to make reliable risk estimates. Thus, illustrative embodiments need to bridge the gap between the user demand for usability and access request context anomaly scoring system 300's need to collect a sufficient number of data points. It turns out that bridging this gap is a natural by-product of recognizing signs for the emergence of new behavior patterns.

Access request context anomaly scoring system 300 needs a sufficient number of data points to identify a new behavior pattern. Consequently, access request context anomaly scoring system 300 assigns a newness score to each new data point and aggregates these newness scores for a plurality of data points. When the aggregated newness score is equal to or above the pre-defined newness score threshold, access request context anomaly scoring system 300 determines that a new behavior pattern exists in the data points and starts the data analytics component in the background to discover/learn the new behavior pattern and builds a new behavior profile.

Figure 4:
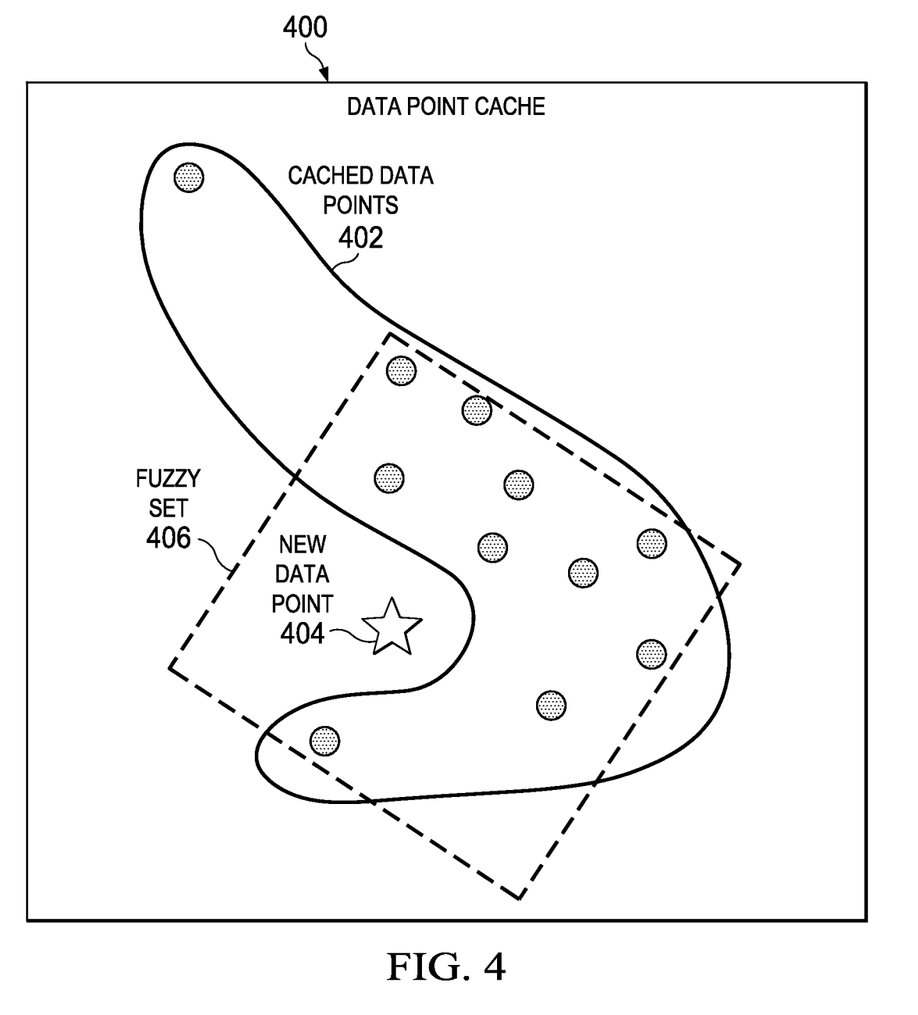
FIG. 4 is a diagram of an example of a data point cache in accordance with an illustrative embodiment.

With reference now to FIG. 4, a diagram of an example of a data point cache is depicted in accordance with an illustrative embodiment. Data point cache 400 is a component that stores data for fast access. Data point cache 400 may be implemented in a data processing system, such as data processing system 200 in FIG. 2 or access request context anomaly scoring system 300 in FIG. 3. Data point cache 400 may be, for example, data point cache 240 in FIG. 2 or data point cache 306 in FIG. 3.

Data point cache 400 includes cached data points 402, new data point 404, and fuzzy set 406. Cached data points 402 represent a plurality of data points corresponding to contexts of a plurality of previously received access requests. New data point 404 represents a newly received data point that corresponds to a context of a newly received access request (i.e., current access request). Fuzzy set 406 represents a proximity relationship between new data point 404 and data points within cached data points 402; the proximity relationship is determined by a pre-defined proximity measure or a distance measure.

To compute a newness score corresponding to new data point 404, illustrative embodiments first compute a cache anomaly score for new data point 404. This cache anomaly score is different from the profile anomaly score generated by illustrative embodiments using a behavior profile. Illustrative embodiments maintain data point cache 400 of recently collected data points and treat new data point 404 as a fuzzy set.

For each and every cached data point in cached data points 402, illustrative embodiments calculate a distance between a particular cached point and new data point 404 using a pre-defined distance measure. Illustrative embodiments transform this distance to a proximity value in the range between zero and one [0, 1] using a pre-defined monotonically decreasing function. This proximity value defines the fuzzy set membership of each cached data point. The closer a particular cached data point is to new data point 404, the larger the fuzzy set membership. Alternatively, illustrative embodiments calculate a proximity score between a particular cached data point and new data point 404 using a pre-defined proximity measure. The closer a particular cached data point is to new data point 404, the larger the proximity score. Illustrative embodiments transform this proximity score to a value in the range between zero and one [0, 1] using a pre-defined monotonically increasing function. This proximity value defines the fuzzy set membership of each cached data point. The closer a particular cached data point is to new data point 404, the larger the fuzzy set membership.

Illustrative embodiments compute a fuzzy union membership of the cached data points' fuzzy sets memberships. The closer the cached data points are to new data point 404, the larger the fuzzy union membership. The larger the number of cached data points that are close to new data point 404, the larger the fuzzy union membership. Illustrative embodiments calculate the cache anomaly score=(1-fuzzy union membership). This cache anomaly score corresponds to new data point 404. The anomaly score computed by illustrative embodiments using a behavior profile, which may be empty (i.e., containing no user behavior patterns), is called the profile anomaly score.

Figure 5:
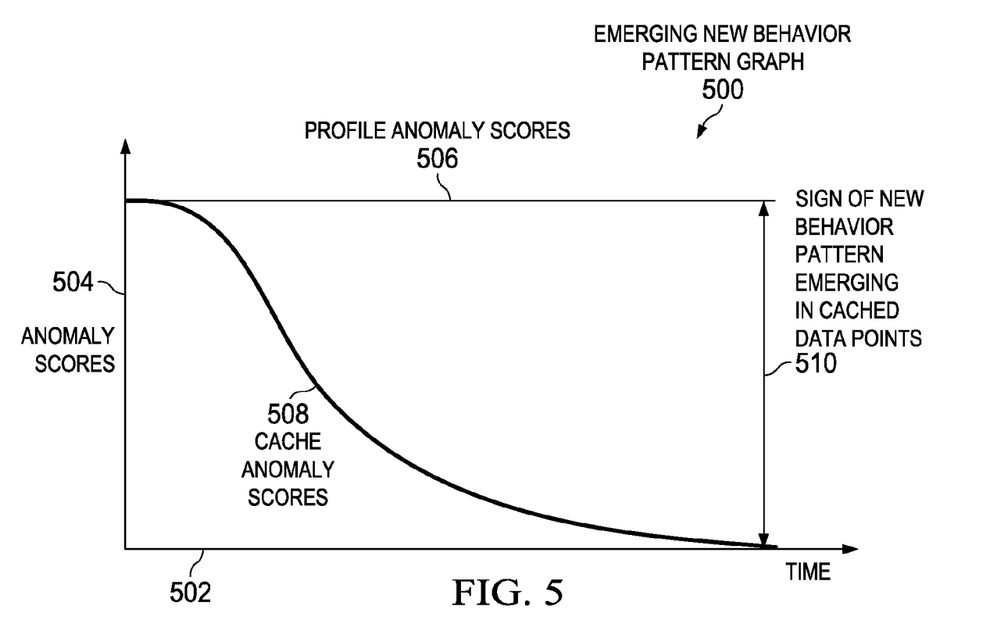
FIG. 5 is a diagram of an example of an emerging new behavior pattern graph in accordance with an illustrative embodiment.

With reference now to FIG. 5, a diagram of an example of an emerging new behavior pattern graph is depicted in accordance with an illustrative embodiment. Emerging new behavior pattern graph 500 includes x-axis time 502 and y-axis anomaly scores 504. Emerging new behavior pattern graph 500 illustrates profile anomaly scores 506, cache anomaly scores 508, and sign of new behavior pattern emerging in cached data points 510.

Emerging new behavior pattern graph 500 is a conceptual diagram that illustrates how profile anomaly scores 506 and cache anomaly scores 508 change as data points from new emerging behavior patterns are received over time 502, before the new emerging behavior patterns are learned and covered by user behavior profiles. Emerging new behavior pattern graph 500 illustrates that cache anomaly scores 508 decrease as more data points from the new emerging behavior pattern are received, but profile anomaly scores 506 remain high because the new emerging behavior pattern is not covered by a user behavior profile yet. The closer cached data points are to a newly received data point, the lower the cache anomaly score. The more cached data points are close to the newly received data point, the lower the cache anomaly score. Illustrative embodiments compute the profile anomaly score for the newly received data point by comparing the newly received data point against a behavior profile corresponding to the user making the current access request. If no user behavior profile exists or the user behavior profile is empty, then illustrative embodiments assign to the newly received data point the highest profile anomaly score possible, which is 1 in FIG. 5. It is possible to use other values for the highest anomaly score. As the difference between profile anomaly scores 506 and cache anomaly scores 508 becomes larger, the indication that a new behavior pattern is emerging becomes stronger, as well. If a data point fits an existing behavior profile, but is not close to any cached data point, then the data point's profile anomaly score will be low and the data point's cache anomaly score will be high. However, the example illustrated in FIG. 5 does not show this situation.

Figure 6:
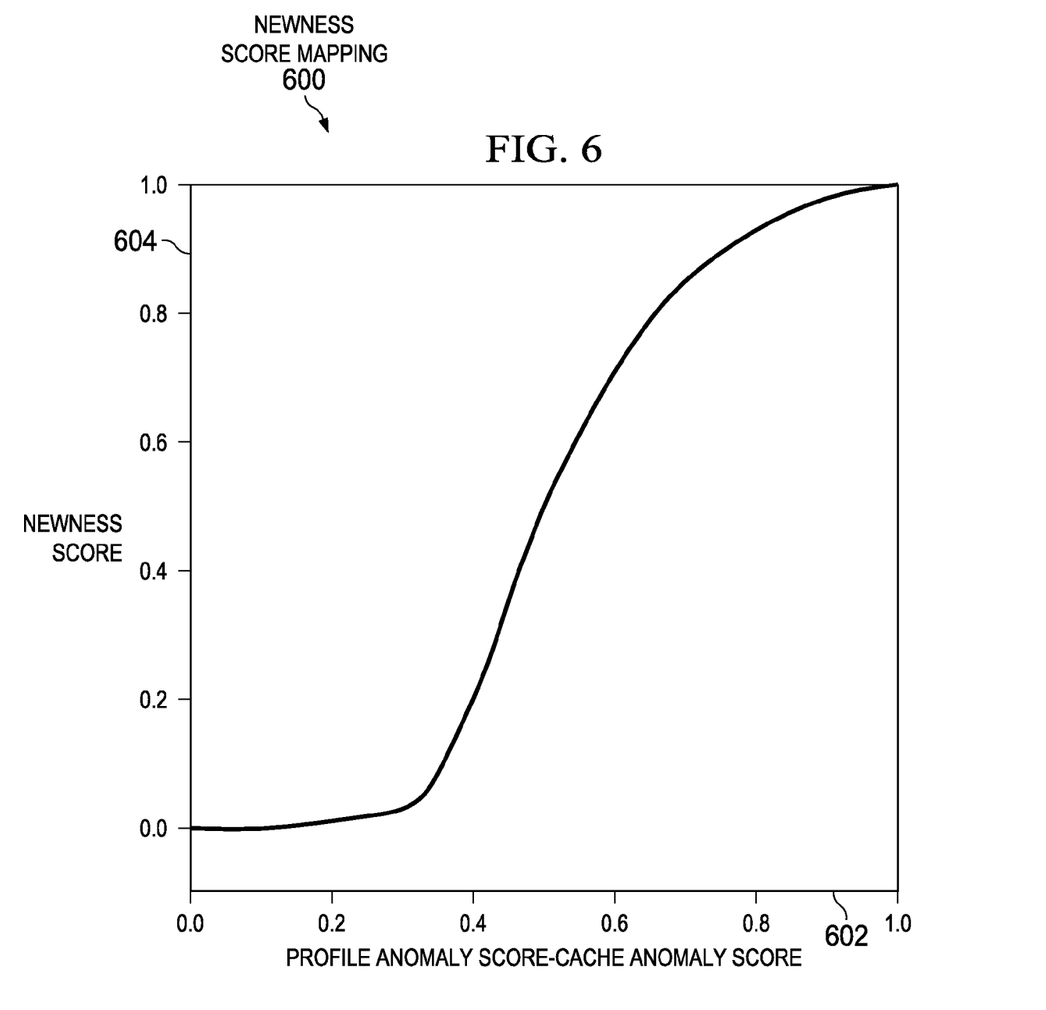
FIG. 6 is a diagram of an example of newness score mapping in accordance with an illustrative embodiment.

With reference now to FIG. 6, a diagram of an example of newness score mapping is depicted in accordance with an illustrative embodiment. Newness score mapping 600 includes x-axis profile anomaly score minus cache anomaly score 602 and y-axis newness score 604. Illustrative embodiments derive the newness score of a newly received data point corresponding to a context of a current access request by comparing the cache anomaly score and the profile anomaly score of the newly received data point. For example, if the profile anomaly score is less than the cache anomaly score, then the newness score is equal to 0.0. The condition (profile anomaly score<cache anomaly score) indicates that the newly received data point is similar to previously received data points covered by an existing user behavior profile. Otherwise, the newness score=newnessMap(profile score−cache score), where newnessMap is a monotonically increasing mapping function with a range between zero and one [0, 1]. In FIG. 6, the newmessMap function corresponds to the curve in newness score mapping 600. This curve maps the difference, (profile score−cache score), into a newness score.

Newness score mapping 600 is meant to de-emphasize smaller (profile anomaly score−cache anomaly score) differences and to emphasize larger ones. Illustrative embodiments consider smaller differences between the profile anomaly score and the cache anomaly score as insignificant because the profile and cache anomaly scores are both semi-subjective. Illustrative embodiments aggregate the newness scores of a plurality of cached data points using simple summation, for example. When the sum is equal to or greater than a pre-defined newness score threshold, illustrative embodiments start an analytics component in the background to learn new behavior patterns in the cached data points. Illustrative embodiments then build a new user behavior profile based on the learned user behavior patterns. The pre-defined newness score threshold may be, for example, 80. This threshold value provides at least a sufficient number of data points for the analytics component to work on. However, it should be noted that illustrative embodiments may utilize any value for the threshold.

Figure 7:
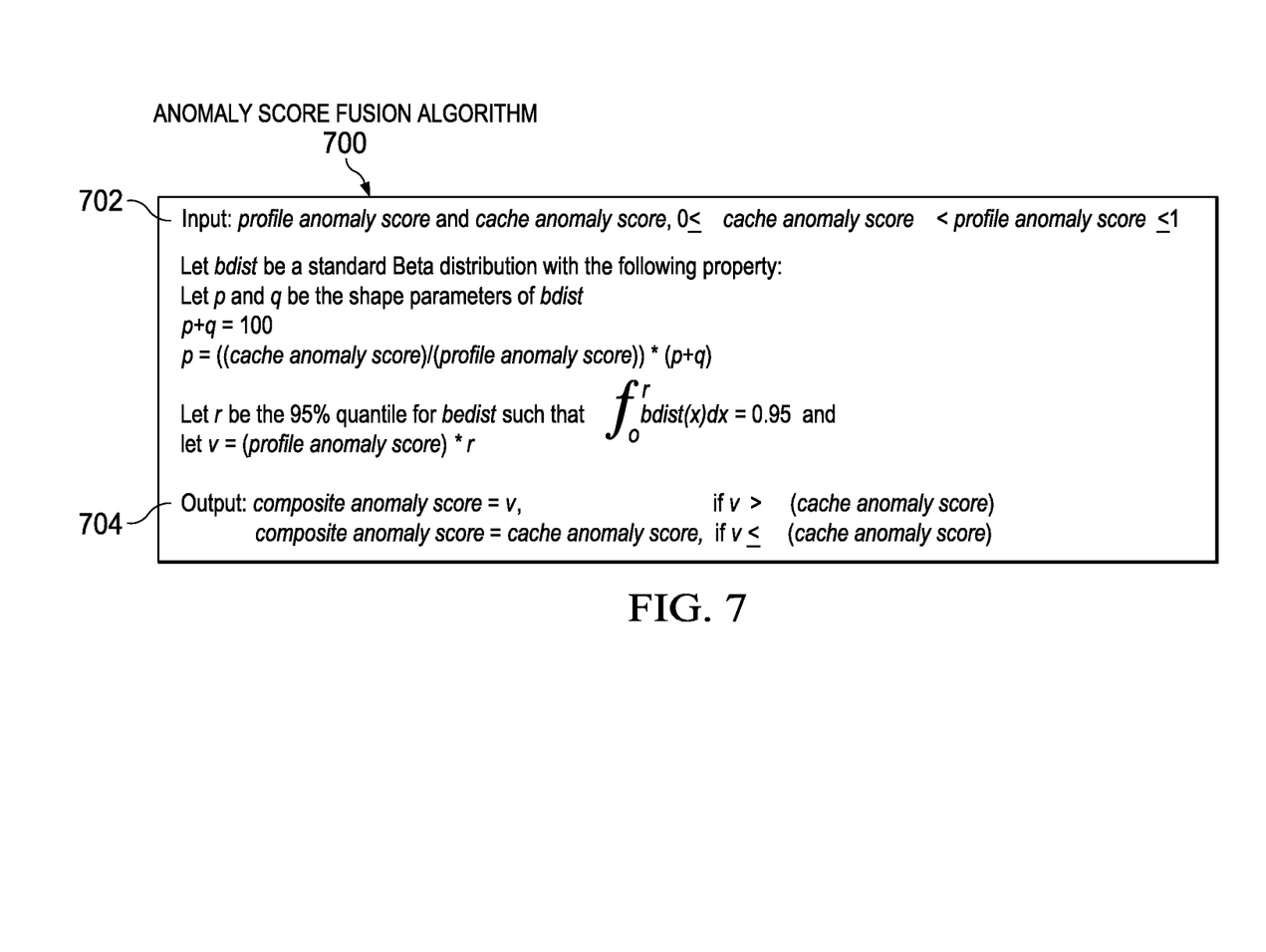
FIG. 7 is a diagram of a specific example of an anomaly score fusion algorithm in accordance with an illustrative embodiment.

With reference now to FIG. 7, a diagram of a specific example of an anomaly score fusion algorithm is depicted in accordance with an illustrative embodiment. Anomaly score fusion algorithm 700 is a process to produce the composite anomaly score by fusing a profile anomaly score and a cache anomaly score of a newly received data point corresponding to a context of a current access request. Anomaly score fusion algorithm 700 may be implemented in, for example, an anomaly score fusion engine, such as anomaly score fusion engine 334 in FIG. 3.

Anomaly score fusion algorithm 700 receives input 702, which includes a profile anomaly score and a cache anomaly score, such as profile anomaly score 314 and cache anomaly score 318 in FIG. 3. Anomaly score fusion algorithm 700 may receive the profile anomaly score and the cache anomaly score from, for example, a profile anomaly scoring engine and a cache anomaly scoring engine, respectively. The profile anomaly scoring engine and the cache anomaly scoring engine may be, for example, profile anomaly scoring engine 312 and cache anomaly scoring engine 316 in FIG. 3.

In this example, the cache anomaly score is larger than or equal to zero (0) and is less than the profile anomaly score. The profile anomaly score is less than or equal to one (1). Anomaly score fusion algorithm 700 outputs output 704, which is a composite anomaly score, such as composite anomaly score 336 in FIG. 3. In this example, the composite anomaly score is equal to the profile anomaly score if the profile anomaly score is less than or equal to the cache anomaly score. If the profile anomaly score is larger than the cache anomaly score, then the composite anomaly score should be somewhere between the cache anomaly score and the profile anomaly score. Anomaly score fusion algorithm 700 is a heuristics-based algorithm to fuse the cache anomaly score and the profile anomaly score to produce the composite anomaly score.

Anomaly score fusion algorithm 700 has the following properties: 1) the composite anomaly score will be in the range between the cache anomaly score and the profile anomaly score; 2) the profile anomaly score will pull the composite anomaly score higher; 3) the cache anomaly score will pull the composite anomaly score lower; and 4) the smaller the cache anomaly score, the heavier the pull it exerts on the composite anomaly score. As the cache anomaly score becomes smaller, the mean value of bdist, (p/(p+q)) in anomaly score fusion algorithm 700 becomes smaller. Also, the variance of bdist in anomaly score fusion algorithm 700 becomes smaller as the cache anomaly score becomes smaller. Therefore, an even heavier pull toward zero (0) is exerted on the composite anomaly score as the cache anomaly score becomes smaller.

Figure 8:
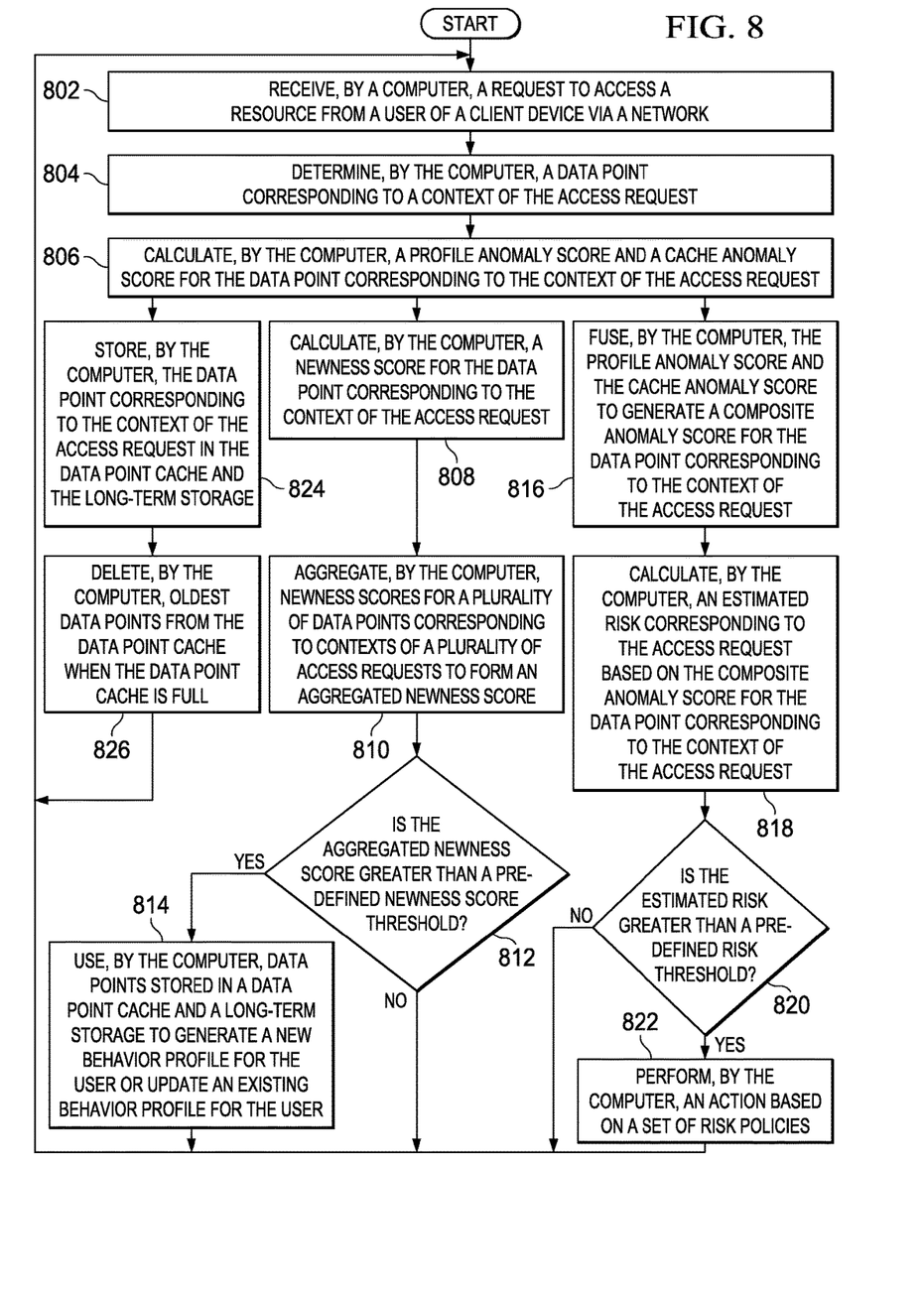
FIG. 8 is a flowchart illustrating a process for calculating anomaly scores corresponding to a context of a request to access a resource by a user in accordance with an illustrative embodiment.

With reference now to FIG. 8, a flowchart illustrating a process for calculating anomaly scores corresponding to a context of a request to access a resource by a user is shown in accordance with an illustrative embodiment. The process shown in FIG. 8 may be implemented in a computer, such as, for example, server 104 in FIG. 1 and data processing system 200 in FIG. 2.

The process begins when the computer receives a request to access a resource from a user of a client device via a network (step 802). The request to access the resource may be, for example, access request 302 in FIG. 3. The client device and the network may be, for example, client 110 and network 102 in FIG. 1. After receiving the request to access the resource in step 802, the computer determines a data point corresponding to a context of the access request (step 804). The data point may be, for example, new data point 404 in FIG. 4.

In addition, the computer calculates a profile anomaly score and a cache anomaly score for the data point corresponding to the context of the access request (step 806). The profile anomaly score and the cache anomaly score may be, for example, profile anomaly score 314 and cache anomaly score 318 in FIG. 3. Further, the computer calculates a newness score for the data point corresponding to the context of the access request (step 808). The newness score may be, for example, newness score for data point 322 in FIG. 3.

Furthermore, the computer aggregates newness scores for a plurality of data points corresponding to contexts of a plurality of access requests to form an aggregated newness score (step 810). The aggregated newness score may be, for example, aggregated newness score for plurality of data points 326 in FIG. 3. Subsequent to generating the aggregated newness score for the plurality of data points in step 810, the computer makes a determination as to whether the aggregated newness score is greater than a pre-defined newness score threshold (step 812).

If the computer determines that the aggregated newness score is less than the pre-defined newness score threshold, no output of step 812, then the process returns to step 802 where the computer continues to receive requests to access resources. If the computer determines that the aggregated newness score is greater than or equal to the pre-defined newness score threshold, yes output of step 812, then the computer uses data points stored in a data point cache and a long-term storage to generate a new behavior profile for the user or update an existing behavior profile for the user (step 814). Thereafter, the process returns to step 802. The data points stored in the data point cache may be, for example, cached data points 402 in data point cache 400 in FIG. 4. The long-term storage may be, for example, long-term storage 208 in FIG. 2. The behavior profile corresponding to the user may be, for example, behavior profile 310 in FIG. 3.

In addition, after calculating the profile anomaly score and the cache anomaly score for the data point corresponding to the context of the access request in step 806, the computer fuses the profile anomaly score and the cache anomaly score to generate a composite anomaly score for the data point corresponding to the context of the access request (step 816). The composite anomaly score for the data point corresponding to the context of the access request may be, for example, composite anomaly score 336 in FIG. 3. Subsequently, the computer calculates an estimated risk corresponding to the access request based on the composite anomaly score for the data point corresponding to the context of the access request (step 818). The estimated risk corresponding to the access request may be, for example, estimated risk 340 in FIG. 3.

Afterward, the computer makes a determination as to whether the estimated risk is greater than a pre-defined risk threshold (step 820). If the computer determines that the estimated risk is less than the pre-defined risk threshold, no output of step 820, then the process returns to step 802. If the computer determines that the estimated risk is greater than or equal to the pre-defined risk threshold, yes output of step 820, then the computer performs an action based on a set of risk policies (step 822). Thereafter, the process returns to step 802. The set of risk policies may be, for example, risk policies 258 in FIG. 2.

Further, after calculating the profile anomaly score and the cache anomaly score for the data point corresponding to the context of the access request in step 806, the computer stores the data point corresponding to the context of the access request in the data point cache and the long-term storage (step 824). The computer also deletes an oldest data point or oldest data points from the data point cache when the data point cache is full (step 826). Thereafter, the process returns to step 802.

Thus, illustrative embodiments provide a computer-implemented method, computer system, and computer program product for adaptively profiling behavior of a user and calculating anomaly scores corresponding to a context of a current request to access a resource by the user via continuous machine learning. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating a behavior profile, the computer-implemented method comprising:
    calculating, by a computer, a newness score for a newly received data point in a data point cache corresponding to a context of an access request to a resource made by a user of a client device;
    generating, by the computer, a fuzzy set of data points corresponding to the newly received data point using a pre-determined number of previously cached data points within a pre-defined distance measure from the newly received data point in the data point cache;
    aggregating, by the computer, newness scores for a plurality of data points corresponding to contexts of a plurality of access requests made by the user to form an aggregated newness score; and
    responsive to the computer determining that the aggregated newness score is greater than or equal to a pre-defined newness score threshold, generating, by the computer, the behavior profile identifying a behavior pattern of the user that corresponds to the plurality of access requests made by the user using the fuzzy set of data points within the pre-defined distance measure from the newly received data point in the data point cache.

2. The computer-implemented method of claim 1 further comprising:
    receiving, by the computer, the access request to the resource from the client device via a network; and
    determining, by the computer, the newly received data point in the data point cache based on characteristics of the context of the access request.

3. The computer-implemented method of claim 1 further comprising:
    calculating, by the computer, a user behavior profile anomaly score and a cache anomaly score for the newly received data point in the data point cache corresponding to the context of the access request, wherein the computer calculates the newness score for the newly received data point by subtracting the cache anomaly score from the user behavior profile anomaly score corresponding to the newly received data point.

4. The computer-implemented method of claim 3, wherein the computer calculates the user behavior profile anomaly score by comparing data corresponding to the context of the access request to data in the behavior profile identifying the behavior pattern of the user making the access request.

5. The computer-implemented method of claim 3, wherein the computer calculates the cache anomaly score by comparing the newly received data point corresponding to the context of the access request with previously cached data points corresponding to contexts of previous access requests that also are located in the data point cache.

6. The computer-implemented method of claim 3 further comprising:
fusing, by the computer, the user behavior profile anomaly score and the cache anomaly score to generate a composite anomaly score for the newly received data point corresponding to the context of the access request.

7. The computer-implemented method of claim 6 further comprising:
calculating, by the computer, an estimated risk corresponding to the access request based on the composite anomaly score for the newly received data point corresponding to the context of the access request.

8. The computer-implemented method of claim 7 further comprising:
determining, by the computer, whether the estimated risk is greater than a pre-defined risk threshold; and
responsive to the computer determining that the estimated risk is greater than or equal to the pre-defined risk threshold, performing, by the computer, an action based on a set of risk policies.

9. The computer-implemented method of claim 8, wherein the action is one of authorize the access request, block the access request, or mitigate a risk associated with the access request.

10. The computer-implemented method of claim 1, wherein the data point cache stores the newly received data point corresponding to the context of the access request and one or more of the pre-determined number of previously cached data points corresponding to contexts of a plurality of previous access requests or time constrained previously cached data points corresponding to contexts of a plurality of previous access requests.

11. A computer system for generating a behavior profile, the computer system comprising:
a bus system;
a storage device connected to the bus system, wherein the storage device stores program instructions; and
a processor connected to the bus system, wherein the processor executes the program instructions to:
calculate a newness score for a newly received data point in a data point cache corresponding to a context of an access request to a resource made by a user of a client device;
generate a fuzzy set of data points corresponding to the newly received data point using a pre-determined number of previously cached data points within a pre-defined distance measure from the newly received data point in the data point cache;
aggregate newness scores for a plurality of data points corresponding to contexts of a plurality of access requests made by the user to form an aggregated newness score; and
generate the behavior profile identifying a behavior pattern of the user that corresponds to the plurality of access requests made by the user using the fuzzy set of data points within the pre-defined distance measure from the newly received data point in the data point cache in response to determining that the aggregated newness score is greater than or equal to a pre-defined newness score threshold.

12. The computer system of claim 11, wherein the processor further executes the program instructions to:
receive the access request to the resource from the client device via a network; and
determine the newly received data point in the data point cache based on characteristics of the context of the access request.

13. The computer system of claim 11, wherein the processor further executes the program instructions to:
calculate a user behavior profile anomaly score and a cache anomaly score for the newly received data point in the data point cache corresponding to the context of the access request, wherein the computer system calculates the newness score for the newly received data point by subtracting the cache anomaly score from the user behavior profile anomaly score corresponding to the newly received data point.

14. A computer program product for generating a behavior profile, the computer program product comprising a computer readable storage medium having program instructions embodied therewith, the program instructions executable by a computer to cause the computer to perform a method comprising:
calculating, by the computer, a newness score for a newly received data point in a data point cache corresponding to a context of an access request to a resource made by a user of a client device;
generating, by the computer, a fuzzy set of data points corresponding to the newly received data point using a pre-determined number of previously cached data points within a pre-defined distance measure from the newly received data point in the data point cache;
aggregating, by the computer, newness scores for a plurality of data points corresponding to contexts of a plurality of access requests made by the user to form an aggregated newness score; and
responsive to the computer determining that the aggregated newness score is greater than or equal to a pre-defined newness score threshold, generating, by the computer, the behavior profile identifying a behavior pattern of the user that corresponds to the plurality of access requests made by the user using the fuzzy set of data points within the pre-defined distance measure from the newly received data point in the data point cache.

15. The computer program product of claim 14 further comprising:
receiving, by the computer, the access request to the resource from the user of the client device via a network; and
determining, by the computer, the newly received data point in the data point cache based on characteristics of the context of the access request.

16. The computer program product of claim 14 further comprising:
calculating, by the computer, a user behavior profile anomaly score and a cache anomaly score for the newly received data point in the data point cache corresponding to the context of the access request, wherein the computer calculates the newness score for the newly received data point by subtracting the cache anomaly score from the user behavior profile anomaly score corresponding to the newly received data point.

17. The computer program product of claim 16, wherein the computer calculates the user behavior profile anomaly score by comparing data corresponding to the context of the access request to data in the behavior profile identifying the behavior pattern of the user making the access request.

18. The computer program product of claim 16, wherein the computer calculates the cache anomaly score by comparing the newly received data point corresponding to the context of the access request with previously cached data points corresponding to contexts of previous access requests that also are located in the data point cache.

19. The computer program product of claim 16 further comprising:
fusing, by the computer, the user behavior profile anomaly score and the cache anomaly score to generate a composite anomaly score for the newly received data point corresponding to the context of the access request.

* * * * *